(12) United States Patent
Fukuoka et al.

(10) Patent No.: US 6,190,430 B1
(45) Date of Patent: Feb. 20, 2001

(54) METHOD FOR PRODUCING HYDROGEN-CONTAINING GAS FOR FUEL CELL

(75) Inventors: Yohei Fukuoka, Shiki; Keizo Tomokuni, Iruma-gun; Hitoshi Nakajima, Yokohama, all of (JP)

(73) Assignee: Asahi Kasei Kogyo Kabushiki Kaisha (JP)

( * ) Notice: Under 35 U.S.C. 154(b), the term of this patent shall be extended for 0 days.

(21) Appl. No.: 09/230,014

(22) PCT Filed: Jul. 15, 1997

(86) PCT No.: PCT/JP97/02445

§ 371 Date: Jan. 14, 1999

§ 102(e) Date: Jan. 14, 1999

(87) PCT Pub. No.: WO98/02377

PCT Pub. Date: Jan. 22, 1998

(30) Foreign Application Priority Data

| Jul. 15, 1996 | (JP) | 8-202804 |
| Sep. 2, 1996 | (JP) | 8-248508 |
| Jan. 27, 1997 | (JP) | 9-025719 |

(51) Int. Cl.⁷ ............... C10K 3/04; C10K 3/06
(52) U.S. Cl. ............. 48/198.3; 48/198.5; 48/199 FM; 48/197 FM; 502/66; 502/102; 502/326; 502/515
(58) Field of Search .......... 48/85, 198.5, 199 FM, 48/203, 198.3, 197 FM, 61; 423/247, 650, 655; 252/373, 184; 518/722, 702; 95/131, 140, 902, 117; 502/515, 53, 102, 326, 227, 231, 230, 66; 429/218.2

(56) References Cited

U.S. PATENT DOCUMENTS

| 3,088,919 | * | 5/1963 | Brown, Jr. et al. | 252/374 |
| 3,216,782 | * | 11/1965 | Cohn | 23/2 |
| 3,631,073 | * | 12/1971 | Cohn et al. | 252/373 |
| 4,046,956 | * | 9/1977 | Fanciullo | 429/20 |
| 4,536,375 | * | 8/1985 | Holt et al. | 423/247 |
| 4,639,432 | * | 1/1987 | Holt et al. | 502/324 |
| 5,098,684 | * | 3/1992 | Kresge et al. | 423/277 |
| 5,134,109 | * | 7/1992 | Uchiyama et al. | 502/324 |
| 5,227,353 | * | 7/1993 | Apelian et al. | 502/74 |
| 5,476,877 | * | 12/1995 | Clavenna et al. | 518/703 |
| 5,486,313 | * | 1/1996 | De Jong et al. | 252/373 |

FOREIGN PATENT DOCUMENTS

| 39-21742 | 10/1964 | (JP) . |
| 3-93602 | 4/1991 | (JP) . |
| 5-168924 | 7/1993 | (JP) . |
| 7-315825 | 12/1995 | (JP) . |
| 8-133702 | 5/1996 | (JP) . |
| 8-295503 | 11/1996 | (JP) . |
| 9-131531 | 5/1997 | (JP) . |

\* cited by examiner

Primary Examiner—Hien Tran
Assistant Examiner—Basia Ridley
(74) Attorney, Agent, or Firm—Pennie & Edmonds LLP

(57) ABSTRACT

An efficient method for producing a hydrogen-containing gas for a fuel cell by using a gas produced by reforming reaction of an organic compound is disclosed. The method comprises the following steps: adding an oxygen-containing gas to a hydrogen-containing gas containing carbon monoxide to form a mixed gas, and bringing the mixed gas into contact with a catalyst comprising a ruthenium metal as a main component and having a carbon monoxide adsorption of not less than 1 mmol/g-ruthenium and a carbon monoxide adsorption index of not less than 0.5, to thereby oxidize and remove carbon monoxide.

5 Claims, 2 Drawing Sheets

PULSE (number of shots)

METHOD FOR PRODUCING HYDROGEN-CONTAINING GAS FOR FUEL CELL

TECHNICAL FIELD

The present invention relates to a method for producing a hydrogen-containing gas used for a fuel cell working at low temperature, and particularly to a method for producing a hydrogen-containing gas for a solid polyelectrolyte type fuel cell (hereinafter referred to as a "PEFC"). Carbon monoxide contained in a hydrogen-containing gas produced by a reforming reaction of an organic compound presents a significant catalytic poison action to platinum or an electrode catalyst of a fuel cell working at low temperature. In the present invention, however, carbon monoxide contained in the hydrogen-containing gas is removed by oxidation using an oxidative removing catalyst to allow the fuel cell to effectively work even at low temperature.

BACKGROUND ART

At present, for commercially obtaining hydrogen in wide areas, the production of hydrogen by reforming of organic compounds, for example, hydrocarbons such as methane and propane, and alcohols such as methanol, particularly by steam reforming thereof is excellent. However, the hydrogen gases obtained under practical reforming conditions by these methods contain several per cent of carbon monoxide. Methods for further converting carbon monoxide to hydrogen and carbon dioxide by the modification reaction or the shift reaction with water vapor have been known. However, from both the chemical equilibrium and the activity of conventional catalysts used, there is a limitation on a reduction in the content of carbon monoxide, and actually, the content of carbon monoxide can only be reduced to about 1%.

On the other hand, attempts to use the hydrogen-containing gases as fuels for fuel cells have been made. In that case, however, it is particularly required to reduce the concentration of carbon monoxide to several ppm or less for allowing PEFCs to efficiently work at low temperature. The reason for this is that carbon monoxide acts as catalytic poison to electrode catalysts of the fuel cells, and that the catalytic poison action of carbon monoxide to the electrode catalysts becomes significant as temperature is lowered. With respect to this, the electrode catalysts have also been improved to raise the resistance to carbon monoxide. For example, a technique has been reported in which a platinum-ruthenium alloy is used as the electrode catalyst to provide the resistance to carbon monoxide. In this electrode catalyst, however, the catalytic poison action of carbon monoxide does not appear when the concentration of carbon monoxide contained in the hydrogen-containing gas is 100 ppm or less. At that time, the working conditions of the PEFC is limited to a high temperature of 100° C. or more.

Further, it has been suggested that the addition of 6% to 13% of oxygen to a hydrogen-containing gas containing carbon monoxide allows a PEFC to work without a decrease in voltage of electric power generated from the PEFC. However, the addition of such a large amount of oxygen brings about the danger of a gas explosion and results in remarkable non-electrochemical oxidation of hydrogen at an electrode to cause a large loss of hydrogen. Further, a wide temperature distribution is developed on a surface of the electrode to cause a significant decrease in voltage generated. Further, it is also reported that if the concentration of carbon monoxide contained in a hydrogen-containing gas is 100 ppm or less, the amount of oxygen added to the hydrogen-containing gas supplied to the above-mentioned electrode requires only about 0.4%. However, it is necessary to provide a step for previously decreasing the concentration of carbon monoxide to 100 ppm or less, so that the whole system becomes complicated. Moreover, even in this case, the non-electrochemical oxidation of hydrogen at the electrode can not be avoided because of the existence of a slight amount of oxygen, which causes the enlargement of a temperature distribution on a surface of the electrode and a decrease in voltage of a fuel cell.

Further, a method has also been studied in which oxygen-containing gas is added to a hydrogen-containing gas containing carbon monoxide, and this gas is brought into contact with an oxidative removing catalyst, thereby oxidizing carbon monoxide to remove it. According to this method, no load is applied to a fuel cell complicatedly operated. This method is therefore an excellent method, if an effective oxidation reaction catalyst is present. According to the report of Toyota Motor Corp. (*The Second Fuel Cell Symposium Lecture Proceedings*, page 235, 1995), it is reported that the concentration of carbon monoxide is decreased to a limit concentration of detection or less by the removal of carbon monoxide by oxidation using a ruthenium catalyst at a reaction temperature of 100° C. In this report, however, the limit concentration of detection of carbon monoxide is 20 ppm. It is further reported that as a result of the reaction at 80° C., 150 ppm of carbon monoxide remains. This shows that the activity of the oxidation reaction catalyst is insufficient at low temperature. No reaction example at lower temperature is described.

Recently, the utilization of PEFCs as power sources for vehicles have been studied. When used for vehicles, the PEFCs and devices for producing the hydrogen-containing gases used as fuels thereof are complicatedly operated and stopped, and rapid standup is required in starting. When the activity of the catalyst for removing carbon monoxide is low, it is necessary to always heat the device at a specified temperature required by the catalyst. Accordingly, a large amount of energy becomes necessary. In some cases, it is also necessary to always heat the PEFC in which the electrode is poisoned by carbon monoxide at low temperature. Further, the carbon monoxide removing reaction and the reaction in the PEFC are exothermic reactions, so that devices for cooling and heating are required, unfavorably resulting in a complicated system.

According to JP-A-8-295503 (the term "JP-A" as used herein means an "unexamined published Japanese patent application"), an attempt is made to remove carbon monoxide at a relatively high temperature of 100° C. or more, preferably 100° C. to 300° C., using a ruthenium catalyst in which ruthenium is carried on titanium oxide. However, no example at a temperature of lower than 100° C. is reported.

There are many reports about studies of adsorption of carbon monoxide on ruthenium catalysts or the oxidative removing catalyst, and further about the use of the pulse process (*Shokubai Koza* (Catalyst Course), vol. 2, page 160, edited by Shokubai Gakkai (Catalytic Society), Kodansha (1985); *Catalysts*, 12, 1 (1970); *Catalysts*, 23, 483 (1981)). However, there is no report in which the relationship between the selective oxidation reaction of a slight amount of carbon monoxide contained in hydrogen gas and the adsorption of carbon monoxide on a catalyst is described, and no indication for selecting an effective catalyst is established.

As described above, carbon monoxide contained in hydrogen gas reduces the output voltage of the fuel cells, so that the exhaustive reduction of carbon monoxide is required for the high efficiency operation of the PEFCs. The greater reduction of carbon monoxide is required for the operation at low temperature, which is an outstanding feature of the PEFCs. Accordingly, the realization of higher activity and selectivity of the oxidative removing catalysts for carbon monoxide at low temperature is indispensable, and particularly, the high activity and selectivity at a temperature of 100° C. or less, more preferably 80° C. or less are required. When various starting conditions and operating conditions are considered, the activity at room temperature or at a temperature of 0° C. or less becomes important.

DISCLOSURE OF THE INVENTION

As a result of extensive investigation for solving the above-mentioned problems, the present inventors have discovered that carbon monoxide is effectively reduced by using, in a hydrogen-containing gas containing carbon monoxide, a catalyst comprising a ruthenium metal as a main component and having a carbon monoxide adsorption of not less than 1 mmol/g-ruthenium and a carbon monoxide adsorption index of not less than 0.5 thus completing the present invention, as an oxidative removing catalyst for carbon monoxide.

That is to say, the present invention is directed to a method for producing a hydrogen-containing gas for a fuel cell, which comprises adding an oxygen-containing gas to a hydrogen-containing gas containing carbon monoxide to form a mixed gas, the hydrogen-containing gas being produced by a reforming reaction of an organic compound, and bringing the mixed gas into contact with a catalyst comprising a ruthenium metal as a main component and having a carbon monoxide adsorption of not less than 1 mmol/g-ruthenium and a carbon monoxide adsorption index as defined below of not less than 0.5, to thereby oxidize and remove carbon monoxide;

Adsorption index=$\Sigma X_1/\Sigma X=\Sigma X_1/(\Sigma X_1+\Sigma X_2)$ wherein A=amount of carbon monoxide introduced/pulse =0.002 mmol/pulse =0.4 mmol/g-ruthenium/pulse;

X=adsorption/pulse;

Amount adsorbed=$\Sigma X$; and

B=reversible adsorption, wherein X at the time when $(X+B)/A \geq 0.9$ is taken as $X_1$, and X at the time when $(X+B)/A<0.9$ is taken as $X_2$.

By the method of the present invention, that is to say, by using the ruthenium catalyst having the specific adsorption characteristics, carbon monoxide contained in the hydrogen-containing gas containing carbon monoxide, the hydrogen-containing gas being produced by the reforming reaction of the organic compound, can be selectively removed by oxidation at a low reaction temperature, whereby the high efficiency operation of the PEFCs which is the object of this invention, particularly the operation at low temperature characterized in the present invention, becomes possible without a complicated operation.

BEST MODE FOR CARRYING OUT THE INVENTION

Figure 1:
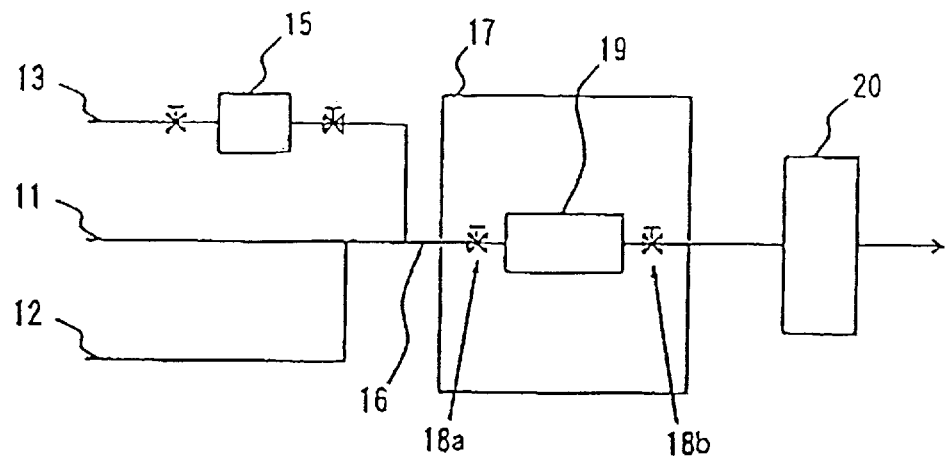
FIG. 1 is a block diagram showing a structure of an experimental arrangement for carbon monoxide adsorption.

The present invention will be illustrated in detail below.

In the present invention, the hydrogen-containing gas containing carbon monoxide produced by the reforming reaction of the organic compound is a gas obtained by reforming of a hydrocarbon such as methane or propane, or an alcohol such as methanol, and usually contains several percent of carbon monoxide. Further, the reforming reaction of the organic compound is partial oxidation reforming with water vapor or oxygen gas.

Then, an oxygen-containing gas is added to the hydrogen-containing gas containing carbon monoxide to form a mixed gas, and this mixed gas is brought into contact with an oxidative removing catalyst comprising ruthenium as a main component and specified as described below.

The first factor specifying the oxidative removing catalyst is the adsorption of carbon monoxide, and the second factor is the adsorption index of carbon monoxide. A method for measuring the adsorption of carbon monoxide and how to determine the adsorption index of carbon monoxide defined in the present invention are shown below. These values are determined by use of an experimental arrangement for adsorption of carbon monoxide by the pulse method shown in FIG. 1.

That is to say, a catalyst for which the adsorption of carbon monoxide is to be measured is collected so as to give a ruthenium content of 5 mg in the catalyst, and charged into a catalyst charging tube 19. The catalyst charging tube 19 is adjusted to 20° C. by a thermostat having heating and cooling functions. Further, the catalyst charging tube 19 has valves 18a and 18b at both ends thereof, and can be detached with these valves 18a and 18b closed. This tube can therefore be used as a catalyst charging tube of a test reacting apparatus for removal of carbon monoxide as it is without contact with air. Helium is introduced through a helium introducing pipe line 11 at a rate of 50 ml/minute for one hour. When pretreatment is conducted with hydrogen, the introduction of helium is stopped, and hydrogen is introduced through a hydrogen introducing pipe line 12 at a rate of 50 ml/minute for a required period of time. During this treatment, the catalyst charging tube 19 is heated in the thermostat 17 as needed. After the termination of the pretreatment with hydrogen, the thermostat is adjusted to 20° C. Helium is introduced again through the helium introducing pipe line 11 at a rate of 50 ml/minute. Subsequently, helium containing 10% of carbon monoxide is introduced through a carbon monoxide introducing tube 13. This gas is calibrated by a gas calibration tube 15, and mixed with helium introduced batchwise as helium containing 0.002 mmol (0.4 mmol/g-ruthenium) from the helium introducing pipe line 11 through a pipe arrangement 16. The resulting mixed gas is led to the catalyst charging tube 19. This carbon monoxide introducing operation is carried out at intervals of 1 minute and 20 seconds. Carbon monoxide is adsorbed by the catalyst in the catalyst charging tube 19. After saturation, eluted carbon monoxide is introduced into a gas chromatograph 20. The gas chromatograph 20 is equipped with an analytical column (Active Carbon, 2 m (stainless column)), and operated at an oven temperature of 180° C. Carbon monoxide introduced is eluted for a retention time of about 50 seconds. Carbon monoxide thus eluted is measured with a TCD detector (thermal conductivity detector). The amount of carbon monoxide detected is determined from the height of a peak for each pulse, taking as 100 the height of a peak of the amount detected at the time when the catalyst charging tube 19 is charged with no catalyst (the amount of carbon monoxide introduced per pulse).

Figure 2:
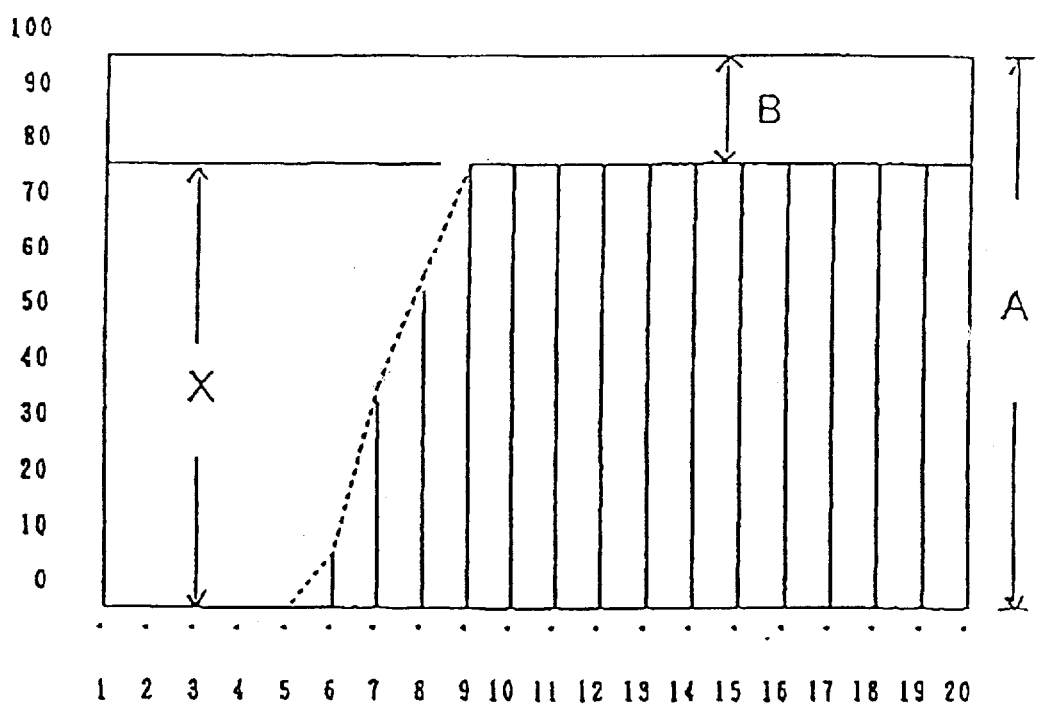
FIG. 2 is a graph showing a model of carbon monoxide adsorption for each pulse.

FIG. 2 is an example of a graph showing the amount of carbon monoxide detected for each pulse. A represents the amount detected at the time when no catalyst is charged, that is to say, the amount of carbon monoxide introduced per pulse (0.002 mmol/pulse, 0.4 mmol/g-ruthenium/pulse). X indicates the adsorption of carbon monoxide varying for each pulse. B represents the difference between the amount eluted at the time when the adsorption of carbon monoxide to the catalyst is saturated and the amount of carbon monoxide eluted becomes constant, that is to say, the reversible adsorption. The adsorption of carbon monoxide is represented by the total $\Sigma X$ of the adsorptions per pulse X.

Of the adsorptions per pulse X, taking X at the time when (X+B) is 0.9A or more as $X_1$, and X at the time when (X+B) is less than 0.9A as $X_2$, the adsorption index of carbon monoxide is represented by the ratio of the total $\Sigma X_1$ of $X_1$ to the total $\Sigma X$ of the absorptions, namely X. $\Sigma X$ is the sum of the total $\Sigma X_1$ of $X_1$ and the total $\Sigma X_2$ of $X_2$. These relations are summarized as below:

$$\text{Adsorption index} = \Sigma X_1/\Sigma X = \Sigma X_1/(\Sigma X_1 + \Sigma X_2)$$

wherein

A=amount of carbon monoxide introduced/pulse

=0.002 mmol/pulse

=0.4 mmol/g-ruthenium/pulse;

X=adsorption/pulse;

Amount adsorbed=$\Sigma X$; and

B=reversible adsorption, wherein X at the time when $(X+B)/A \geq 0.9$ is taken as $X_1$, and X at the time when $(X+B)/A < 0.9$ is taken as $X_2$.

The catalyst for use in the present invention is a catalyst comprising a ruthenium metal as a main component and having a carbon monoxide adsorption of not less than 1 mmol/g-ruthenium and a carbon monoxide adsorption index of not less than 0.5. A catalyst having a high adsorption of carbon monoxide, but a low adsorption index, or a catalyst having a high adsorption index, but a low adsorption of carbon monoxide does not show the effect of the present invention, that is to say, the selective oxidation characteristics of carbon monoxide at low temperature. Indicating the respective preferred ranges, the adsorption of carbon monoxide is preferably 1.5 mmol/g-ruthenium or more, and more preferably 2 mmol/g-ruthenium or more. Further, the adsorption index of carbon monoxide is preferably 0.7 or more, and more preferably 0.8 or more.

The above-mentioned catalyst for use in the present invention is preferably used in the form of a supported catalyst where ruthenium is supported on a carrier. The carrier may be any as long as it is usually used as a carrier. For example, effective are alumina, silica-alumina, silica gel, molecular sieve 3A, ZSM-5, zeolite represented by zeolite-X, zeolite-Y and zeolite-beta, mesopore molecular sieves represented by MCM-41, zirconia, hafnia, titania, rare earth oxides, basic oxides represented by oxides of calcium, magnesium and zinc, and active carbon. Of these carriers, alumina, silica-alumina, zeolite, mesopore molecular sieves, zirconia and hafnia are preferably used. More preferably, alumina, mesopore molecular sieves, zirconia and hafnia are used, and most preferably, mesopore molecular sieves, zirconia and hafnia are used. Zirconia or hafnia is also preferably used as a mixture thereof. Further, using a precursor of zirconia or hafnia, a carrier in which a surface of the above-mentioned carrier such as alumina or a mesopore molecular sieve is converted to zirconia or hafnia is also preferably used.

The above-mentioned mesopore molecular sieves are inorganic porous materials having uniform pore size of 1.5 nm to 10 nm in the mesopore region, and complex oxide compositions of silica, zirconia, hafnia or silicon with metals described below, or metallosilicate molecular sieves.

The above-mentioned metals include alkaline earth metal elements such as magnesium and calcium, and zinc of group II; boron, aluminum, gallium, yttrium and rare earth elements of group III; titanium, zirconium, germanium and tin of group VI; phosphorus and vanadium of group V; chromium, molybdenum and tungsten of group VI; manganese and rhenium of group VII; and iron, cobalt, nickel, noble metal elements such as ruthenium, rhodium, palladium and platinum of group VIII.

Preferred metal oxides are boron oxide (boria), aluminum oxide (alumina), titanium oxide (titania), zirconium oxide (zirconia), hafnium oxide (hafnia), at least one selected from precursors thereof and silica. Particularly preferred examples of the metal oxides include alumina, zirconia and hafnia.

The atomic ratio (Si/M) of silicon to the metal element (M) is usually 10 or more. A mesopore molecular sieve composed of zirconia is preferably used.

The ruthenium catalyst using the above-mentioned mesopore molecular sieve as a carrier has the high activity and selectivity for selectively removing carbon monoxide in hydrogen gas by oxidation at low temperature, not to mention at high temperature. When silica mesopore molecular sieves containing aluminum, zirconium and hafnium, zirconia mesopore molecular sieves, zirconia and hafnium are used as carriers, the effect is particularly remarkable, and the activity for removing carbon monoxide by oxidation and selectivity at low temperature, particularly at room temperature or lower, is significantly improved.

As methods for synthesizing these mesopore molecular sieves, methods for synthesizing the sieves by hydrothermal synthesis using quaternary ammonium salts or phosphonium salts having long-chain alkyl groups as templates are disclosed in U.S. Pat. Nos. 5,098,684, 5,102,643 and 5,108,725 and JP-W-5-503499 (the term "JP-W" as used herein means an "unexamined published international patent publication"), and methods for synthesizing the sieves from layer silica by ion exchange methods using long-chain alkyl ammonium cations are disclosed in JP-A-4-238810. Synthesis of the mesopore molecular sieves of zirconia or silica-zirconia is described in *J. Chem. Soc., Chem. Commun.*, 2093 (1995), 2243 (1996) and 431 (1977). However, the mesopore molecular sieves used in the present invention are not limited to those synthesized by these methods, as long as the sieves are inorganic porous materials having uniform pores in mesopore regions, as described above.

Further, as the mesopore molecular sieves, inorganic porous materials containing organic carbon groups are effective. Methods for synthesizing the organic carbon group-containing mesopore molecular sieves are described in, for example, Japanese Patent Application No. 8-166622, i.e., a laid-open Japanese Patent application JP-A-9-328312. Such mesopore molecular sieves are synthesized from metal oxides and/or precursors thereof in the presence of silane compounds shown below:

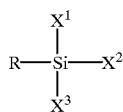

wherein R represents an organic carbon group; $X^1$, $X^2$ and $X^3$ each represents a group selected from alkoxy groups having 1 to 6 carbon atoms, a hydroxyl group and halogen atoms.

The silane compound is a compound indicated by the above-mentioned chemical formula, and it is particularly preferred that the organic carbon group represented by R is a saturated or unsaturated hydrocarbon group having 1 to 12 carbon atoms or a derivative thereof in which hydrogen residues thereof are partly substituted by groups such as halogen, hydroxyl, alkoxy, amino, alkylamino and alkyl groups. Specific examples thereof include alkyl groups such as methyl, ethyl, propyl, butyl, pentyl, hexyl, heptyl, octyl, nonyl, decyl, undecyl and dodecyl; unsaturated hydrocarbon groups such as vinyl, propenyl, butenyl, pentenyl, hexenyl, heptenyl, octenyl, nonenyl, decenyl, undecenyl and dodecenyl; aryl groups such as phenyl, tolyl, xylyl, naphthyl and methylnaphthyl; and derivatives thereof in which hydrogen is partly substituted by groups such as halogen and hydroxyl groups. Alkyl groups each having 1 to 12 carbon atoms and aryl groups each having 6 to 12 carbon atoms are preferred. Of these, methyl and ethyl for the alkyl groups, phenyl for the aryl groups, and derivatives thereof are particularly preferred.

Substituent groups represented by $X^1$, $X^2$ and $X^3$ in the above-mentioned chemical formula are each a group selected from alkoxy groups each having 1 to 6 carbon atoms, a hydroxyl group and halogen atoms, and may be the same or different. Preferred examples of the silane compounds are monoalkyltrialkoxysilanes or monoaryltrialkoxysilanes and derivatives thereof.

As the mesopore molecular sieves having organic carbon groups, mesopore molecular sieves whose surfaces are silylated are also effective. Examples of the silylated mesopore molecular sieves include MCM-41 silylated with hexamethyldisiloxane and trimethyl chloride (*The 78th Catalyst Symposium* (A) *Lecture Proceedings*, 6D26). The silylation is not limited to this method, and any methods may be used as long as they are known.

The catalysts having the above-mentioned organic carbon group-containing mesopore molecular sieves as the carriers have the strong activity for removing carbon monoxide in the hydrogen gas by oxidation, and the strong resistance to water in the hydrogen gas. Hydrogen produced by the reforming of organic compounds contains water used in excess in reforming. Water is further formed by the oxidation of hydrogen, a side reaction of the oxidative removing reaction of carbon monoxide. Such water is adsorbed on surfaces of the ruthenium catalysts to inhibit the oxidation reaction of carbon monoxide. This inhibiting function more strongly appears under low-temperature conditions, at a temperature of 80° C. or less, particularly under conditions of room temperature or lower, and further strongly appears under conditions under which water is frozen, at 0° C. or less.

The mesopore molecular sieves into which the organic carbon groups are introduced by the silane compounds at the time of synthesis of the mesopore molecular sieves are particularly excellent in waterproof characteristics as the carriers of the oxidative removing catalysts, and further good in uniformity of their structure and in reproducibility of their production. Moreover, the catalyst in which ruthenium is carried on the carriers can be easily produced, and the reproducibility of the performance of the catalysts produced is good. Further, the stability of the carriers and catalysts in the reaction at high temperature is excellent. Furthermore, the mesopore molecular sieves into which the organic carbon groups are introduced by the silane compounds at the time of synthesis of the mesopore molecular sieves have hydroxyl groups in their structure. It is therefore effective that surfaces of these molecular sieves are further silylated and used as the carriers.

The above-mentioned carriers may be used as such or as mixtures. Although the carriers may be used in any shape, it is also effective to use them as particles such as spherical particles and columnar particles, or as formed articles represented by honeycombs.

As raw materials for ruthenium used in the catalysts of the present invention, those which can be dissolved in solvents such as water to prepare homogeneous solutions are effective. Examples thereof include inorganic acid salts, organic acid salts and carbonyl complexes of ruthenium. It is also effective to prepare complexes such as ammine complexes with ammonium and use them. Compounds which are easily available and inexpensive include ruthenium halides, and particularly, ruthenium chloride is preferred. Further, halogen-containing complexes prepared from these halides are also effective. The halides are stable and water-soluble to cause the catalysts to be easily prepared, and further, the use of these raw materials easily provide the catalysts with ruthenium finely dispersed.

Ruthenium can be supported on the above-mentioned carriers by various methods. For example, precipitation methods such as coprecipitaion methods, sol-gel methods, ion exchange methods and impregnation methods are effective.

Reducing agents are acted on the catalysts prepared by the above-mentioned methods to reduce the ruthenium compound to metallic ruthenium. As the reducing agent, hydrogen is effective. The reduction with organic compounds such as formalin and hydrazine is also effective. The reducing operation is effectively conducted in a gas phase, and also in a liquid phase, for example, in an aqueous solution. The reducing temperature may be any, as long as the ruthenium compounds are converted to metallic ruthenium. However, too high temperature unfavorably results in sintering of ruthenium. This temperature is usually from room temperature to 700° C., and preferably from room temperature to 500° C., although it varies according to the method of preparing the catalyst.

In the present invention, it is effective to use substantially halogen-free catalysts. The use of the substantially halogen-free catalysts as the oxidative removing catalysts for carbon monoxide allows carbon monoxide to be selectively removed by oxidation at low temperature. Further, these catalysts have a high adsorption of carbon monoxide and a high adsorption index thereof.

In an ordinary oxidation reaction, halogen on the surface of the catalyst is easily removed by an oxidizing agent, for example, oxygen. Accordingly, halogen in a reaction system in which the oxidation reaction proceeds is removed at an early stage, and can be removed without using a special operation. In the ordinary oxidation reaction, therefore, the presence of a slight amount of halogen scarcely raises a problem. However, when a halogen-containing catalyst is used in the oxidative removing reaction of carbon monoxide in the present invention, halogen on this catalyst is little removed and does not disappear in the reaction system. It is therefore preferred that halogen used in the raw material for ruthenium is previously removed.

As methods for removing halogen on the catalysts, there are several methods. Removal by reduction with hydrogen is usually employed. However, this method requires an operation at high temperature for completely removing halogen, which causes the sintering of ruthenium, and it is difficult to remove halogen only by this operation. This method is therefore unfavorable. Further, methods for removing halogen by oxidation at a temperature of about 500° C. using oxygen-containing gases are used for removing halogen from many noble metal catalysts. Even in these methods, the ruthenium catalysts are liable to induce the sintering of ruthenium, different from the other noble metal catalysts, and an increase in the particle size of ruthenium reduces the adsorption of carbon monoxide. Accordingly, these methods are required to be carefully performed at a relatively low temperature. However, it is difficult to completely remove halogen at low temperature.

According to the description of Example 1 in JP-A-8-295503, a ruthenium catalyst in which ruthenium is supported on titania by a impregnation method using ruthenium chloride is burned at 500° C. for 4 hours, and then, reduced in a stream of hydrogen at 500° C. for one hour. The ruthenium catalyst in which ruthenium is supported on titania, which was treated in the same manner as with this method, was low in the adsorption of carbon monoxide, and the activity for removing carbon monoxide by oxidation at low temperature was not observed.

Then, in the present invention, it is preferred to remove halogen with alkali agents. This operation of removing halogen is preferably carried out after ruthenium is supported on the carrier, or after reduction with hydrogen. It is also preferred that this operation is carried out after removal by oxidation with oxygen gas at low temperature. Further, this operation is conducted during precipitation procedure or treatment in a liquid phase, depending on the preparing method. This operation is also preferably carried out during reduction in water. These removing operations are also preferably conducted in aqueous solutions. The alkali agents used may be any as long as they can remove halogen. Examples thereof include oxides or hydroxides of alkali metals such as lithium or alkaline earth metals such as magnesium, organic bases such as ammonia and amines, and base type ion exchange resins. The ruthenium catalysts subjected to the above-mentioned operations of halogen removal treatment are used in the present invention.

On the other hand, a carrier industrially used, for example, alumina, usually contains 10 ppm to tens of parts per million of chlorine, and more in some cases. Chlorine contained in the carrier is not removed by the above-mentioned operation. In this reaction, however, such halogen contained in the carrier has no effect, and does not impair the effect of the present invention.

In the catalyst in which a noble metal is supported on the carrier, the supported amount of the noble metal is usually 1% by weight or less, and at most several percent or less, based on the carrier. This is because even if the supported amount of the noble metal is increased, the catalytic performance corresponding to the increased amount is not exhibited in many cases, and the expensive noble metal is intended to be used most effectively. In contrast, the supported amount of ruthenium in the catalyst used in the present invention may be any. However, in the case of the present invention, for effectively removing carbon monoxide by oxidation, ruthenium is supported on in a larger amount than usual catalysts. For exhibiting the activity at low temperature, the supported amount of ruthenium is 3% by weight or more, preferably 5% by weight, and more preferably 9% by weight or more. Depending on the carrier, for example, in the case of the mesopore molecular sieve, preferably 10% to 30% by weight gives preferred results. As described above, it has become clear that the catalysts of the present invention in which a large amount of ruthenium is supported on show the performance of removing carbon monoxide by oxidation corresponding to or more than the amount of ruthenium increased. In particular, they give a significant effect in the removal of carbon monoxide by oxidation at low temperature, which is the object of the present invention.

It is preferred that the catalyst of the present invention is previously pretreated in a gas mainly composed of hydrogen, thereafter kept without contacting with an oxygen-containing gas, and used in the oxidative removing reaction of carbon monoxide. The gases mainly composed of hydrogen may contain carbon dioxide, water vapor, nitrogen, methanol and hydrocarbons such as methane, in addition to hydrogen, and preferably have a hydrogen content of 50 mol % or more. They may contain a small amount of carbon monoxide. It is preferred that the gas mainly composed of hydrogen at the pretreatment stage does not substantially contain oxygen. The pretreatment temperature is usually from room temperature to 600° C., preferably from 50° C. to 400° C., and more preferably from 70° C. to 300° C. This operation is conducted at ordinary pressure, but may be conducted under pressure in some cases. When the catalyst previously treated in the gas mainly composed of hydrogen is exposed to an oxidation atmosphere, oxygen is adsorbed on the surface of ruthenium. As a result, the adsorbate inhibits the oxidative removing reaction of carbon monoxide, resulting in the difficulty of effectively removing carbon monoxide by oxidation. The catalyst exposed to the oxidation atmosphere like this does not varies in the adsorption of carbon monoxide, but unfavorably decreases in the adsorption index of carbon monoxide.

As an example of activating the catalyst with a hydrogen-containing reductive gas, there is a pretreatment method of the catalyst described in Example 1 of JP-A-5-201702. According to this method, the catalyst is treated from room temperature to about 450° C. at a rate of about 20° C./minute with hydrogen gas containing carbon monoxide and oxygen diluted with nitrogen gas. However, this treated catalyst is low in the adsorption index of carbon monoxide shown in this application, and shows no oxidative removing activity of carbon monoxide.

Hydrogen gas produced by the reforming of organic compounds contains water vapor. When the temperature of the catalyst is low, for example, at the start, the water vapor pressure in the hydrogen gas coming into contact with the catalyst of the present invention sometimes approaches or exceeds the saturated water vapor pressure. As a result, water vapor is adsorbed or condensed on the catalyst in excess, which depresses the catalytic activity. The water vapor pressure in the hydrogen gas is preferably less than the saturated water vapor pressure at a temperature of the catalyst of the present invention, and more preferably less than 50% of the saturated water vapor pressure. Accordingly, before the hydrogen gas produced by the reforming of organic compounds comes into contact with the catalyst of the present invention, water vapor is preferably trapped and removed as water, for example, by bringing it into contact with a low-temperature material. Further, it is preferred that the hydrogen gas is brought into contact with a drying agent.

The drying agents used in the present invention are suitably drying agents reversibly adsorbing and releasing water vapor by changing the temperature, preferably adsorbing water vapor at 50° C. or less and releasing it at a temperature of 100° C. of more. Examples of the drying agents used in the present invention include drying agents usually used, such as silica gel, active alumina and molecular sieves, and compounds containing water of crystallization having a desorption temperature of 50° C. to 100° C., such as calcium sulfate and magnesium sulfate. The amount of the drying agent is an amount necessary for adsorbing water vapor until the temperature of the catalyst is elevated to a temperature at which the partial pressure of water vapor is lower than the saturated water vapor pressure, and depends on the amount of hydrogen gas treated and the heat radiating characteristics of the carbon monoxide removing catalyst.

The present invention will be illustrated in greater detail with reference to the following examples, but the invention should not be construed as being limited thereto.

In the examples, the X-ray diffraction pattern was measured by use of an RAD III type diffractometer manufactured by Rigaku Corporation. The pore distribution and the specific surface were measured by the BET method using nitrogen by use of a Sorptmatic 1800 type instrument manufactured by Carlo Erba Co. The amount of chlorine contained in a catalyst was measured by an RIX-3000 manufactured by Rigaku Corporation. The infrared absorption spectrum was measured with a Perkin Elmer 1600 type spectrophotometer.

REFERENCE EXAMPLE 1

Synthesis of Silica Mesopore Form

Using a 300-ml beaker, 82 g of ethanol and 10 g of dodecylamine were added to 100 g of distilled water, and dissolved therein. Then, 41.8 g of tetraethyl orthosilicate was added thereto with stirring. The resulting mixture was stirred at 27° C. for 30 minutes, followed by a still standing reaction for 30 minutes. Then, the reaction product was filtered and washed with water, and thereafter dried at 110° C. for 5 hours to obtain 18.5 g of a powdery white product. A template (ammine) contained in the dried product was removed. For obtaining a mesopore form, 10 g of the dried product was dispersed in 1500 ml of ethanol containing 0.1 mol of hydrochloric acid, followed by extraction at 60° C. for one hour and filtration. This operation was repeated three times. The resulting product was washed with alcohol, and thereafter dried at 100° C. for 3 hours to obtain 6.5 g of a silica mesopore molecular sieve.

The powder X-ray diffraction pattern showed a strong peak at a d value of 36.0 angstroms.

The specific surface and the pore distribution were measured by the nitrogen adsorption-desorption method. As a result, the specific surface was 1016 $m^2/g$, and the average pore size was 3.1 nm.

REFERENCE EXAMPLE 2

Synthesis of Silica-Alumina Mesopore Form

Synthesis was performed in the same manner as with Reference Example 1 with the exception that 2.7 g of finely divided aluminum isopropoxide was added in addition to 41.2 g of tetraethyl orthosilicate. The resulting product was treated in the same manner as with Reference Example 1 to obtain 6.4 g of a silica-alumina mesopore molecular sieve as a dried powder.

As a result of the measurement of the specific surface by the BET method, the specific surface was 1005 $m^2/g$.

REFERENCE EXAMPLE 3

Synthesis of Zirconia Mesopore Form

Similarly to Reference Example 1, using a 300-ml beaker, 60 g of propanol and 10 g of octylamine were added to 100 g of distilled water, and 31.7 g of ammonium sulfate was further dissolved therein. Then, 38 g of zirconium tetrapropoxide was added with stirring, and concentrated hydrochloric acid was added thereto until the pH of the resulting mixture reached 1.7. The mixture was allowed to react at 27° C. for 72 hours with stirring. Then, the reaction product was filtered and washed with water, and thereafter dried at 80° C. for 5 hours to obtain a powdery white product. This dried product was dispersed in 1500 ml of ethanol, followed by extraction at 60° C. for one hour and filtration. This operation was repeated three times. Then, the resulting product was washed with alcohol, and thereafter dried at 100° C. for 3 hours to obtain 4.5 g of a zirconia mesopore molecular sieve.

As a result of the measurement of the specific surface. by the BET method, the specific surface was 200 $m^2/g$, and the average pore size was 3.2 nm.

REFERENCE EXAMPLE 4

Synthesis of Phenyl-Silica-Alumina Mesopore Form

Synthesis was performed in the same manner as with Reference Example 2 with the exception that the amount of tetraethyl orthosilicate was changed to 33.3 g and 9.6 g of phenyltriethoxysilane was further added. The resulting product was treated in the same manner as with Reference Example 2 to obtain 6.4 g of a phenyl group-containing silica-alumina mesopore molecular sieve as a dried powder. This powder showed water repellency, and had the property of floating on the water surface when added to water.

The powder X-ray diffraction pattern showed a strong peak at a d value of 32.5 angstroms.

REFERENCE EXAMPLE 5

Synthesis of Methyl-Silica-Alumina Mesopore Form

Synthesis was performed in the same manner as with Reference Example 2 with the exception that the amount of tetraethyl orthosilicate was changed to 33.3 g and 7.2 g of methyltriethoxysilane was further added. The resulting product was treated in the same manner as with Reference Example 2 to obtain 6.3 g of a methyl group-containing silica-alumina mesopore molecular sieve as a dried powder. This powder showed water repellency, and had the property of floating on the water surface when added to water.

The powder X-ray diffraction pattern showed a strong peak at a d value of 32.0 angstroms.

The specific surface and the pore distribution were measured by the nitrogen adsorption-desorption method. As a result, the specific surface was 1340 $m^2/g$.

REFERENCE EXAMPLE 6

Carrying of Ruthenium

To 20 g of a carrier, a 3 wt % aqueous solution of ruthenium chloride containing ruthenium in a specified amount to be supported on the carrier was added, and evaporated to dryness on a water bath with stirring. Of this, 10 g was treated in a stream of hydrogen at 400° C. for 2 hours. After cooling to room temperature, it was taken out and immersed in half a 0.05 N aqueous solution of sodium hydroxide necessary for neutralizing chlorine contained in the catalyst. After standing for 2 hours with stirring, it was separated by filtration. This operation was repeated twice, and thereafter it was further repeatedly washed with distilled water until the wash water showed neutrality. Then, it was dried, and treated in a stream of hydrogen at 400° C. for 3 hours. The resulting product was cooled to room temperature under an atmosphere of nitrogen, and taken out.

REFERENCE EXAMPLE 7

Measurement of Adsorption of Carbon Monoxide and Adsorption Index of Carbon Monoxide Using an experimental arrangement for adsorption of carbon monoxide shown in FIG. 1, the adsorption of carbon monoxide and the adsorption index of carbon monoxide were determined. A catalyst was weighed in an amount so as to give a ruthenium amount of 5 mg, and charged into a catalyst charging tube 19. The catalyst charging tube 19 was adjusted to 20° C. with a thermostat 17. Helium was introduced through a helium introducing pipe line 11 at a rate of 50 ml/minute. After one hour, for pretreatment with hydrogen, the introduction of helium was stopped, and hydrogen was introduced through a hydrogen introducing pipe line 11 at a rate of 50 ml/minute for 2 hours. During this treatment, the catalyst charging tube 19 was heated to 100° C. with the thermostat 17. After the termination of the pretreatment with hydrogen, the thermostat was adjusted to 20° C. Helium was introduced again through the helium introducing pipe line 11 at a rate of 50 ml/minute. Helium containing 10% of carbon monoxide was introduced through a carbon monoxide introducing tube 13. This gas was calibrated by a gas calibration tube 15, and mixed with helium introduced batchwise by pulses as helium containing 0.002 mmol (0.4 mmol/g-ruthenium) from the helium introducing pipe line 12 through a pipe arrangement 16. The resulting mixed gas was led to the catalyst charging tube 19. This carbon monoxide introducing operation was carried out at intervals of 1 minute and 20 seconds. Carbon monoxide was adsorbed by the catalyst in the catalyst charging tube 19. After saturation, eluted carbon monoxide was analyzed with a gas chromatograph 20. The gas chromatograph 20 was equipped with an analytical column (Active Carbon, 2 m (stainless column)), and operated at an oven temperature of 180° C. Carbon monoxide was eluted for a retention time of about 50 seconds, and measured with a TCD detector (thermal conductivity detector). The amount of carbon monoxide detected was determined from the ratio of the height of a peak for each pulse, taking as 100 the height of a peak of the amount detected at the time when the catalyst charging tube 19 is charged with no catalyst (the amount of carbon monoxide introduced per pulse).

Based on this result, the adsorption of carbon monoxide and the adsorption index of carbon monoxide were determined according to the above-mentioned equation.

REFERENCE EXAMPLE 8

Oxidative Removing Reaction of Carbon Monoxide

Figure 3:
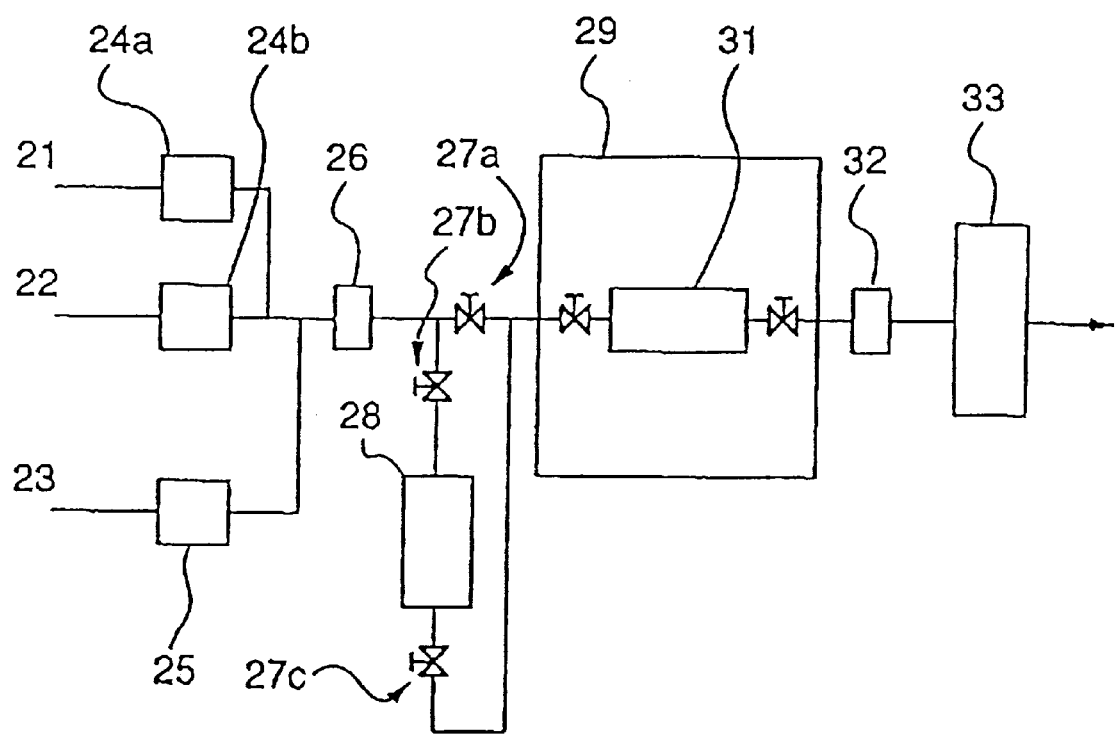
FIG. 3 is a block diagram showing a reacting apparatus for carbon monoxide removal test.

The oxidative removing reaction of carbon monoxide was conducted by using a test reacting apparatus for removal of carbon monoxide shown in FIG. 3. A catalyst charging tube 31 was charged with a specified amount of a catalyst. The catalyst charging tube 31 was provided with a thermostat 29 controlled to a specified temperature with a heater and a cooler. When pretreatment was conducted with hydrogen, hydrogen or a hydrogen-containing reductive gas was introduced from a hydrogen introducing pipe line 21 through a thermal flow 24a, and the catalyst charging tube 31 was heated to conduct the pretreatment. After cooled to room temperature, the catalyst charging tube 31 was set to a specified temperature to initiate an oxidative removing reaction of carbon monoxide. A component-adjusted mixed gas was introduced through a mixed gas introducing pipe line 22, setting the flow rate to a specified value with a thermal mass flow 24b. When water was introduced, water was introduced through a water introducing pipe line 23, setting the flow rate to a specified value with a measuring pump 25. A gas mixer 26 was heated as needed. When a water vapor preparing device 28 was used, valves 27b and 27c were opened, and a valve 27a was closed to introduce the mixed gas into the catalyst charging tube 31 through the water vapor preparing device 28. Water was removed from a reaction gas with a water trap 32, and thereafter the reaction gas was analyzed on a PID gas chromatograph 33.

EXAMPLE 1

A reactor of a test reacting apparatus for removal of carbon monoxide was charged with 0.9 ml (ruthenium content: 30 mg) of a catalyst (adsorption of carbon monoxide: 3.6 mmol/g-ruthenium, adsorption index of carbon monoxide: 0.88, chlorine content: 20 ppm) in which the methyl-silica-alumina mesopore molecular sieve synthesized in Reference Example 5 was used as a carrier and 10% by weight of ruthenium was supported on the carrier in Reference Example 6. The catalyst was treated in a stream of hydrogen at 100° C. for 2 hours, and cooled to room temperature further in a stream of hydrogen. Then, instead of hydrogen, a mixed gas in which 0.1% of carbon monoxide and 0.3% of oxygen were added to a mixed gas of hydrogen and carbon dioxide (hydrogen:carbon dioxide=3:1) was supplied to the above-mentioned reactor at a space velocity of 20,000 ml/ml of catalyst/hour. Heat generation was observed in the reactor, and the temperature of an external wall of the reactor and the temperature of the catalyst were elevated to 23° C. and 32° C., respectively. Carbon monoxide in the gas at an outlet of the reactor was analyzed. As a result, no carbon monoxide was detected. The reactor was heated to elevate the temperature to 70° C. At that time, water vapor was introduced into the reactor at a rate of 40 ml/minute. In addition, the reactor was heated to 80° C. and 100° C., and the oxidative removing reaction was conducted in the same manner as described above for each case. As a result, no carbon monoxide was detected in the gas at an outlet of the reactor under either conditions. Carbon monoxide was analyzed by using a PID (photoionization detector) gas chromatograph (manufactured by Hitachi, Ltd.). The lower limit of detection for carbon monoxide of this gas chromatograph is 0.5 ppm.

EXAMPLE 2

In Example 1, 0.9 ml (ruthenium content: 63 mg) of a catalyst (adsorption of carbon monoxide: 2.1 mmol/g-ruthenium, adsorption index of carbon monoxide: 0.85, chlorine content: 20 ppm or less) in which 20% by weight of ruthenium was supported on the carrier was used, and the reactor was changed to one equipped with a cooler and a heater. The reactor was cooled, and at the time when the temperature reached −18° C., the oxidative removing reaction was initiated. Heat generation was observed in the reactor, and the temperature of a catalyst layer was elevated to −3° C. When carbon monoxide in the gas at an outlet of the reactor was analyzed, no carbon monoxide was detected. After one hour, the measurement was made again. As a result, the concentration of carbon monoxide was 450 ppm. It is considered that water produced by the burning of hydrogen, a side reaction, covered part of a surface of the catalyst. The reactor was heated, and at the time when temperature was elevated to 0° C., the concentration of carbon monoxide at the outlet was 90 ppm. When the temperature was further elevated to room temperature, no carbon monoxide was detected. After an elapse of 2 hours, the measurement was made again. As a result, no carbon monoxide was detected.

EXAMPLE 3

In Example 1, the catalyst was changed to 0.9 ml (ruthenium content: 8 mg) of a catalyst (adsorption of carbon monoxide: 2.6 mmol/g-ruthenium, adsorption index of carbon monoxide: 0.80) in which 3% by weight of ruthenium was supported on the carrier. The temperature of the external wall of the reactor and the temperature of the catalyst were elevated to 24° C. and 26° C., respectively. When carbon monoxide in the gas at the outlet of the reactor was analyzed, the concentration of carbon monoxide was 450 ppm. At the reaction device temperatures of 70° C., 80° C. and 100° C., no carbon monoxide was detected.

EXAMPLE 4

In Example 1, the catalyst was changed to 0.9 ml (ruthenium content: 8 mg) of a catalyst (adsorption of carbon monoxide: 2.7 mmol/g-ruthenium, adsorption index of carbon monoxide: 0.80) in which the silica-alumina mesopore molecular sieve synthesized in Reference Example 2 was used as a carrier and 3% by weight of ruthenium was supported on the carrier in Reference Example 6. When the temperature of the external wall of the reactor was 24° C., the temperature of the catalyst was elevated to 26° C. When carbon monoxide in the gas at the outlet of the reactor was analyzed, the concentration of carbon monoxide was 850 ppm. The concentration of carbon monoxide was 487 ppm at a reactor temperature of 70° C., and 224 ppm at 80° C. When the reactor temperature was 100° C., no carbon monoxide was detected.

EXAMPLE 5

In Example 1, the catalyst was changed to 0.9 ml (ruthenium content: 30 mg) of a catalyst (adsorption of carbon monoxide: 3.1 mmol/g-ruthenium, adsorption index of carbon monoxide: 0.85) in which the silica mesopore molecular sieve synthesized in Reference Example 1 was used as a carrier and 10% by weight of ruthenium was supported on the carrier in Reference Example 6. When the temperature of the external wall of the reactor was 24° C., the temperature of the catalyst was elevated to 26° C. When carbon monoxide in the gas at the outlet of the reactor was analyzed, the concentration of carbon monoxide was 450 ppm. The concentration of carbon monoxide was 40 ppm at a reactor temperature of 70° C., and no carbon monoxide was detected at 80° C. and 100° C.

EXAMPLE 6

In Example 1, the catalyst was changed to 0.9 ml (ruthenium content: 30 mg) of a catalyst (adsorption of carbon monoxide: 2.4 mmol/g-ruthenium, adsorption index of carbon monoxide: 0.80) in which the phenyl-silica-alumina mesopore molecular sieve synthesized in Reference Example 4 was used as a carrier and 10% by weight of ruthenium was supported on the carrier in Reference Example 6. When the temperature of the external wall of the reactor was 24° C., the temperature of the catalyst was elevated to 32° C. When carbon monoxide in the gas at the outlet of the reactor was analyzed, the concentration of carbon monoxide was 5 ppm. No carbon monoxide was detected at reactor temperatures of 70° C., 80° C. and 100° C.

EXAMPLE 7

In Example 4, the catalyst was changed to 0.9 ml (ruthenium content: 14 mg) of a catalyst (adsorption of carbon monoxide: 2.6 mmol/g-ruthenium, adsorption index of carbon monoxide: 0.84) in which 5% by weight of ruthenium was supported on the carrier. The temperature of the external wall of the reactor and the temperature of the catalyst were elevated to 28° C. and 32° C., respectively. When carbon monoxide in the gas at the outlet of the reactor was analyzed, the concentration of carbon monoxide was 630 ppm. No carbon monoxide was detected at reactor temperatures of 70° C., 80° C. and 100° C.

EXAMPLE 8

In Example 4, the catalyst was changed to 0.9 ml (ruthenium content: 30 mg) of a catalyst (adsorption of carbon monoxide: 2.7 mmol/g-ruthenium, adsorption index of carbon monoxide: 0.82) in which 10% by weight of ruthenium was supported on the carrier. The temperature of the external wall of the reactor and the temperature of the catalyst were elevated to 27° C. and 39° C., respectively. When carbon monoxide in the gas at the outlet of the reactor was analyzed, no carbon monoxide was detected. No carbon monoxide was also detected at reactor temperatures of 70° C., 80° C. and 100° C.

EXAMPLE 9

In Example 1, the amount of the catalyst was changed to 0.45 ml (ruthenium content: 15 mg). The temperature of the external wall of the reactor and the temperature of the catalyst were elevated to 27° C. and 42° C., respectively. When carbon monoxide in the gas at the outlet of the reactor was analyzed, the concentration of carbon monoxide was 25 ppm. No carbon monoxide was detected at reactor temperatures of 70° C., 80° C. and 100° C.

EXAMPLE 10

In Example 3, the amount of the catalyst was changed to 1.8 ml (ruthenium content: 16 mg). The temperature of the external wall of the reactor and the temperature of the catalyst were elevated to 27° C. and 30° C., respectively. When carbon monoxide in the gas at the outlet of the reactor was analyzed, the concentration of carbon monoxide was 280 ppm. No carbon monoxide was detected at reactor temperatures of 70° C., 80° C. and 100° C.

EXAMPLE 11

In Example 1, the catalyst was changed to 0.9 ml (ruthenium content: 40 mg) of a catalyst (adsorption of carbon monoxide: 2.0 mmol/g-ruthenium, adsorption index of carbon monoxide: 0.85) in which the zirconia mesopore molecular sieve synthesized in Reference Example 3 was used as a carrier and 10% by weight of ruthenium was supported on the carrier in Reference Example 6. When the temperature of the external wall of the reactor was 24° C., the temperature of the catalyst was elevated to 32° C. When carbon monoxide in the gas at the outlet of the reactor was analyzed, no carbon monoxide was detected. No carbon monoxide was also detected at reactor temperatures of 70° C., 80° C. and 100° C.

EXAMPLE 12

In Example 1, the catalyst was changed to 0.9 ml (ruthenium content: 60 mg) of a catalyst (adsorption of carbon monoxide: 2.5 mmol/g-ruthenium, adsorption index of carbon monoxide: 0.83) in which zirconia was used as a carrier and 5% by weight of ruthenium was supported on the carrier in Reference Example 6. When the temperature of the external wall of the reactor was 21° C., the temperature of the catalyst was elevated to 36° C. When carbon monoxide in the gas at the outlet of the reactor was analyzed, no carbon monoxide was detected. No carbon monoxide was also detected at reactor temperatures of 70° C. and 80° C.

EXAMPLE 13

In Example 1, the catalyst was changed to 0.9 ml (ruthenium content: 65 mg) of a catalyst (adsorption of carbon monoxide: 2.3 mmol/g-ruthenium, adsorption index of carbon monoxide: 0.83) in which hafnia (containing 10% by weight of zirconia) was used as a carrier and 5% by weight of ruthenium was supported on the carrier in Reference Example 6. When the temperature of the external wall of the reactor was 21° C., the temperature of the catalyst was elevated to 35° C. When carbon monoxide in the gas at the outlet of the reactor was analyzed, no carbon monoxide was detected. No carbon monoxide was also detected at reactor temperatures of 70° C. and 80° C.

EXAMPLE 14

In Example 1, the catalyst was changed to 0.9 ml (ruthenium content: 55 mg) of a catalyst (adsorption of carbon monoxide: 2.0 mmol/g-ruthenium, adsorption index of carbon monoxide: 0.68) in which titania was used as a carrier and 5% by weight of ruthenium was supported on the carrier according to Reference Example 6. When the temperature of the external wall of the reactor was 28° C., the temperature of the catalyst was elevated to 34° C. When carbon monoxide in the gas at the outlet of the reactor was analyzed, the concentration of carbon monoxide was 400 ppm. Further, 140 ppm of carbon monoxide was detected at a reactor temperature of 70° C., and 85 ppm at 80° C. Furthermore, the space velocity of the mixed gas was changed to 10,000 ml/ml of catalyst/hour, and a similar reaction was conducted. As a result, the concentration of carbon monoxide was 55 ppm at a reactor temperature of 70° C., and 15 ppm at 80° C.

COMPARATIVE EXAMPLE 1

Using a titania carrier, 5 wt % ruthenium was evaporated to dryness on a water bath as shown in Reference Example 6. Of this, 10 g was burned at 500° C. for 4 hours. Subsequently, the catalyst was reduced at 500° C. for one hour. Using this catalyst, a treatment similar to that of Example 14 was performed. The supported catalyst was changed to 0.9 ml (ruthenium content: 56 mg) of a catalyst (adsorption of carbon monoxide: 0.7 mmol/g-ruthenium, adsorption index of carbon monoxide: 0.60). When the temperature of the external wall of the reactor was 26° C., the temperature of the catalyst was elevated to 32° C. When carbon monoxide in the gas at the outlet of the reactor was analyzed, the concentration of carbon monoxide was 800 ppm. Further, 340 ppm of carbon monoxide was detected at a reactor temperature of 70° C., and 280 ppm at 80° C. Furthermore, the space velocity of the mixed gas was changed to 10,000 ml/ml of catalyst/hour, and a similar reaction was conducted. As a result, the concentration of carbon monoxide was 245 ppm at a reactor temperature of 70° C., and 150 ppm at 80° C.

EXAMPLE 15

In Example 1, the catalyst was changed to 0.9 ml (ruthenium content: 50 mg) of a catalyst (adsorption of carbon monoxides 2.6 mmol/g-ruthenium, adsorption index of carbon monoxide: 0.88) in which alumina manufactured by Nikki Chemical Co., Ltd. was used as a carrier and 5% by weight of ruthenium was supported on the carrier in Reference Example 6. When the temperature of the external wall of the reactor was 23° C., the temperature of the catalyst was elevated to 31° C. When carbon monoxide in the gas at the outlet of the reactor was analyzed, no carbon monoxide was detected.

COMPARATIVE EXAMPLE 2

In Example 1, the catalyst was changed to 0.9 ml (ruthenium content: 50 mg) of a commercial ruthenium/alumina catalyst (adsorption of carbon monoxide: 2.5 mmol/g-ruthenium, adsorption index of carbon monoxide: 0.05) which was not pretreated with hydrogen. When the temperature of the external wall of the reactor was 23° C., the temperature of the catalyst did not vary. The concentration of carbon monoxide in the gas at the outlet of the reactor was 920 ppm. When the oxidative removing reaction was conducted at 60° C., the concentration of carbon monoxide was 750 ppm, and when conducted at 100° C., the concentration of carbon monoxide was 50 ppm.

COMPARATIVE EXAMPLE 3

To 25 g of an alumina carrier manufactured by Nikki Chemical Co., Ltd., 80 ml of an aqueous solution containing 2.6 g of ruthenium chloride was added, and evaporated to dryness on a water bath. Of this, 10 g was taken and treated in a stream of hydrogen at 400° C. for 3 hours. The resulting product was cooled to room temperature under an atmosphere of nitrogen, and taken out. The chlorine content of this catalyst was 10,000 ppm. Using 0.9 ml of this catalyst, the operation was carried out in the same manner as with Example 1. When the temperature of the external wall of the reactor was 23° C., the reaction started. The heat generation in the reactor was little, and the temperature of the catalyst was 23° C. When carbon monoxide in the gas at the outlet of the reactor was analyzed, the concentration of carbon monoxide was 850 ppm. The reactor was therefore heated so as to give a catalyst temperature of 33° C., and the experiment was continued. At this time, carbon monoxide in the gas at the outlet of the reactor was analyzed. As a result, the concentration of carbon monoxide was 780 ppm.

Further, after the termination of the reaction, the chlorine content in this catalyst was measured. As a result, it was 10,000 ppm.

EXAMPLE 16

In Example 1, 5 g of the catalyst before use in Comparative Example 3 was immersed in a 0.05 N aqueous solution of sodium bicarbonate. After standing for 2 hours with stirring, it was separated by filtration. This operation was repeated once again. Thereafter, it was repeatedly washed with distilled water until the wash water showed neutrality. After this operation, it was dried, and treated in a stream of hydrogen at 300° C. for one hour. The resulting product was cooled to room temperature under an atmosphere of nitrogen, and taken out. The chlorine content of this catalyst was 20 ppm. The operation was conducted in the same manner as described in Example 3 . When the temperature of the external wall of the reactor was 23° C., the reaction started. The heat generation in the reactor was observed, and the temperature of the catalyst was 34° C. The concentration of carbon monoxide in the gas at the outlet of the reactor was 1 ppm.

COMPARATIVE EXAMPLE 4

In Comparative Example 3, the catalyst before use in the reaction was treated in a stream of hydrogen at 740° C. for 3 hours. The chlorine content of the resulting catalyst was 20 ppm.

Using 0.9 ml of this catalyst, the operation was carried out in the same manner as with Example 1. The heat generation in the reactor was little, and the temperature of the catalyst was 23° C. When carbon monoxide in the gas at the outlet of the reactor was analyzed, the concentration of carbon monoxide was 750 ppm. The reactor was therefore heated so as to give a catalyst temperature of 33° C., and the experiment was continued. At this time, carbon monoxide in the gas at the outlet of the reactor was analyzed. As a result, the concentration of carbon monoxide was 700 ppm. Further, after the termination of the reaction, the chlorine content in this catalyst was measured. As a result, it was 1,000 ppm.

EXAMPLE 17

In Example 1, the catalyst was changed to the catalyst used in Example 2. Further, a mixed gas in which 1% of carbon monoxide and 1.5% of oxygen were added to the mixed gas of hydrogen and carbon dioxide (hydrogen:carbon dioxide=3:1) was supplied at a space velocity of 20,000 ml/ml of catalyst/hour, and water vapor was further introduced at a rate of 40 ml/minute through a measuring pump 25. A gas mixer 26 was heated to 90° C. Valves 27b and 27c were opened, and a valve 27a was closed to allow water vapor to pass through a water vapor preparing device 28. The water vapor preparing device 28 was charged with molecular sieve 3A in a sufficient amount to adsorb water vapor passing therethrough for one hour. The temperatures of the water vapor preparing device 28 and the reactor (catalyst charging tube 31) were 30° C. When the mixed gas was introduced into the reactor, the temperature of the catalyst was elevated to 83° C. When carbon monoxide in the gas at the outlet of the reactor was analyzed, no carbon monoxide was detected. The reaction was further continued. After 6 hours, carbon monoxide in the gas at the outlet of the reactor was analyzed. As a result, no carbon monoxide was detected.

COMPARATIVE EXAMPLE 5

In Example 17, the catalyst was changed to the catalyst used in Example 2. Further, a mixed gas in which 1% of carbon monoxide and 1.5% of oxygen were added to the mixed gas of hydrogen and carbon dioxide (hydrogen:carbon dioxide=3:1) was supplied at a space velocity of 20,000 ml/ml of catalyst/hour, and water vapor was further introduced at a rate of 40 ml/minute through a measuring pump 25. A gas mixer 26 was heated to 90° C. Valves 27b and 27c were closed, and a valve 27a was opened to conduct the reaction without allowing water vapor to pass through a water vapor preparing device 28. The temperature of the reactor (catalyst charging tube 31) was 30° C. When the mixed gas was introduced into the reactor, the temperature of the catalyst was slightly elevated, but immediately decreased. When carbon monoxide in the gas at the outlet of the reactor was analyzed, about 1% of carbon monoxide was detected.

INDUSTRIAL APPLICABILITY

As described above, according to the present invention, the concentration of carbon monoxide in carbon monoxide-containing hydrogen gas produced by the reforming reaction of organic compounds is reduced, which makes it possible to highly efficiently operate the fuel cells at low temperature.

What is claimed is:

1. A method for producing a hydrogen-containing gas for a fuel cell which comprises:

adding pulse an oxygen-containing gas to a hydrogen-containing gas containing carbon monoxide to form a mixed gas, said hydrogen-containing gas being produced by a reforming reaction of an organic compound; and bringing said mixed gas into contact with a catalyst comprising a ruthenium metal as a main component and having a carbon monoxide adsorption of not less than 1 mmol/g-ruthenium and a carbon monoxide adsorption index as defined below of not less than 0.5, to thereby oxidize and remove carbon monoxide:

$$\text{Adsorption index} = \Sigma X_1 / \Sigma X = \Sigma X_1 / (\Sigma X_1 + \Sigma X_2)$$

wherein

A=amount of carbon monoxide introduced/pulse

=0.002 mmol/pulse

=0.4 mmol/g-ruthenium/pulse;

X=adsorption/pulse;

Amount adsorbed=$\Sigma X$; and

B=reversible adsorption, wherein X at the time when $(X+B)/A \geqq 0.9$ is taken as $X_1$, and X at the time when $(X+B)/A < 0.9$ is taken as $X_2$.

2. The method according to claim 1, wherein said catalyst is substantially free from a halogen.

3. The method according to claim 1 or 2, wherein said catalyst further comprises a mesopore molecular sieve as a carrier thereof.

4. The method according to claim 1 or 2, wherein said catalyst further comprises a carrier selected from zirconium compounds and/or hafnium compounds.

5. The method according to claim 1 or 2, wherein a water vapor pressure in said mixed gas is less than the saturated water vapor pressure at a temperature of said catalyst.

* * * * *

UNITED STATES PATENT AND TRADEMARK OFFICE
CERTIFICATE OF CORRECTION

PATENT NO. : 6,190,430 B1
DATED : February 20, 2001
INVENTOR(S) : Fukuoka et al.

It is certified that error appears in the above-identified patent and that said Letters Patent is hereby corrected as shown below:

Title page,
The name of assignee was incorrect:

"ASAHI KASEI KOGYO KABUSHIKI KAISYA" is correctly

-- ASAHI KASEI KABUSHIKI KAISYA and THE NOGUCHI INSTITUTE --.

Signed and Sealed this

Sixth Day of November, 2001

*Attest:*

NICHOLAS P. GODICI
*Attesting Officer*    *Acting Director of the United States Patent and Trademark Office*